United States Patent [19]

Julian

[11] Patent Number: 5,696,516
[45] Date of Patent: Dec. 9, 1997

[54] RADAR SYSTEM AND ACCURATE METHOD OF RANGE RESOLUTION

[75] Inventor: Michael D. Julian, Playa Del Rey, Calif.

[73] Assignee: Hughes Electronics, Los Angeles, Calif.

[21] Appl. No.: 672,754

[22] Filed: Jun. 28, 1996

[51] Int. Cl.$^6$ .................................................. G01S 13/08
[52] U.S. Cl. ........................ 342/118; 342/134; 342/139
[58] Field of Search .................................... 342/118, 139, 342/145, 109, 134

[56] References Cited

U.S. PATENT DOCUMENTS

| | | | |
|---|---|---|---|
| 4,954,830 | 9/1990 | Krikorian et al. | 342/137 |
| 5,212,489 | 5/1993 | Nelson | 342/109 |
| 5,504,489 | 4/1996 | Kronhamn | 342/118 |

Primary Examiner—J. Woodrow Eldred
Attorney, Agent, or Firm—Leonard A. Alkov; Wanda K. Denson-Low

[57] ABSTRACT

In accordance with the teachings of the present invention, a radar system (20) and method of determining the range (R) to a remote target (14) is provided. The method includes computing a plurality of simulated M-dimensional points ($x_o(t)$) as a function of return pulse arrival times over a range of expected return pulse arrival times ($t_1$ through $t_2$). The computed simulated points ($x_o(t)$) are stored as function of return pulse arrival times in a memory (42) of the system (20). An antenna (10) is aligned in the direction of the remote target (14) and transmits at least one electromagnetic pulse (12) in the direction of the remote target (14) such that the pulse (12) reflects off the remote target (14) as a return pulse (16). The return pulse (16) is sampled at M different times representing a M-dimensional measured point (x). The measured point (x) is compared with each of the simulated points ($x_o(t)$) stored in the memory (42) for determining which of the simulated points ($x_o(t)$) and its corresponding pulse arrival time are closest to the measured point (x).

20 Claims, 4 Drawing Sheets

RADAR SYSTEM AND ACCURATE METHOD OF RANGE RESOLUTION

BACKGROUND OF THE INVENTION

1. Technical Field

This invention relates to a radar system and method for determining the range to a remote target and, more particularly, to a pulsed doppler radar system and method for accurately estimating a range to a remote target using over-sampling processing of a return pulse, reflected off the target, that is represented as a M-dimensional point.

2. Discussion of Related Art

In many environments it is desirable to precisely estimate the range and size of a remote target using a radar system. The use of current radar systems for accurately estimating the range to a target within a given range ambiguity typically employ signal processing methods, such as centroiding, that only use the amplitude information of a sampled return pulse signal. Unfortunately, the use of such previous processing methods does not provide the most accurate or effective range estimations for a given number of samples taken of a return pulse and requires large amounts of data regarding the return pulse for estimating target size. Additionally, the accuracy of such signal processing techniques is effected by the presence of noise and attenuation effects upon return pulse signals that have bounced off a remote target.

It is therefore desirable to provide a radar system and method for accurately estimating the range to a remote target using full phase and amplitude information of an over sampled return pulse signal.

More particularly, it is desirable to provide a pulsed doppler radar system and signal processing method that utilizes full signal phase and amplitude information by representing a specific number of range samples, M, as a M-dimensional point for providing an optimal maximum likelihood estimate of the range to a remote target.

It is further desirable to calculate a signal scale factor for scaling a measured return pulse signal in order to maximize the accuracy of the estimated range to a remote target and the cross-section the remote target.

SUMMARY OF THE INVENTION

In accordance with the teachings of the present invention, a radar system and method of determining the range to a remote target is provided.

In accordance with a first embodiment of the present invention, the method of determining the range to a remote target includes generating a plurality of voltages defining simulated vectors representing a simulated return pulse as a function of a range of expected return pulse arrival times. An antenna is aligned and transmits at least one electromagnetic pulse in the direction of the remote target such that the pulse reflects off the remote target as a return pulse. The antenna receives the return pulse which is sampled at a plurality of times defining a measured vector and point. The measured vector is compared with each of the simulated vectors in order to determine which of the simulated vectors is closest in distance to the measured vector. The return pulse arrival time corresponding to the closest simulated vector is used to determine the range to the remote target.

In accordance with a preferred embodiment, a scale factor based upon the measured vector and the closest simulated vector is calculated and used to scale the measured vector. The scaled measured vector is then compared with each of the simulated vectors for determining which of the simulated vectors is closest in distance to the scaled measured vector. The return pulse arrival time corresponding to the new closest simulated vector is used to determine a new more accurate range to the remote target. The scale factor is also used to estimate the size of the target.

BRIEF DESCRIPTION OF THE DRAWINGS

Other objects and advantages of the present invention will become apparent to those skilled in the art upon reading the following detailed description and upon reference to the drawings in which.

DETAILED DESCRIPTION OF THE PREFERRED EMBODIMENTS

The following description of the preferred embodiments is merely exemplary in nature and is in no way intended to limit the invention or its application or its uses.

The present invention is particularly concerned with providing a pulsed doppler radar system and method of accurately estimating the range to a remote target as well as estimating the cross-section of the target by over-sampling a return pulse signal received by an antenna of the radar system. The sampled return pulse signal is represented as a multi-dimensional vector defining a point in multi-dimensional complex space which is optimized by maximum likelihood and full coherent processing techniques. A unique method of combining a single return pulse's range samples and a geometric approach to determining a maximum likelihood function for estimating the return pulse's arrival time is provided. An advantage of the present invention is that the radar system and method of using the radar system is table driven such that a table of simulated return pulse signal samples and corresponding return pulse arrival times over an expected range of times are precomputed and stored in a memory location within the radar system. The use of such a precomputed table allows for changes and/or replacement of the radar system parameters without requiring recoding of the radar system software. Additionally, the use of the precomputed table maximizes the accuracy of the estimated range and size of the remote target.

The present invention further advantageously determines a scale factor for scaling a measured return pulse signal in order to increase the accuracy of the computed range estimate as well as provide a natural way of determining the remote target's cross-section.

Figure 1:
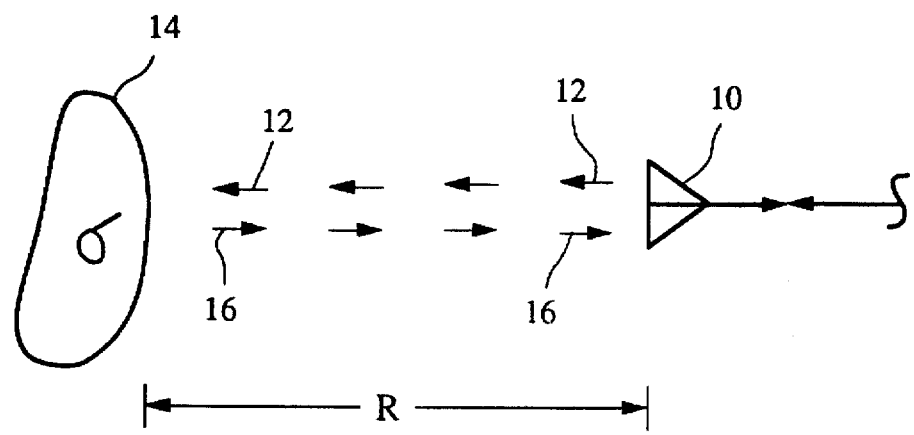
FIG. 1 schematically illustrates an antenna radiating a train of electromagnetic pulses which reflect off a remote target and are received by the antenna for processing.

FIG. 1 schematically illustrates a pulsed doppler radar antenna 10 which radiates electromagnetic pulses of energy 12. The antenna 10 is aligned in the direction of a remote target 14, having a cross-section G, such that the radiated pulses 12 reflect off the target 14 as return pulses 16. As illustrated, the remote target 14 is at a range R from the antenna be. As will be discussed in detail below, in order to obtain a highly accurate estimate of the range to and cross section of the remote target 14, the antenna 10 receives at least one of the return pulses 16 for over-sampling processing. Preferably, the range R is within a given ambiguity as determined by standard range ambiguity resolution techniques. Therefore, the range R is a highly accurate estimate within a given range ambiguity.

Figure 2:
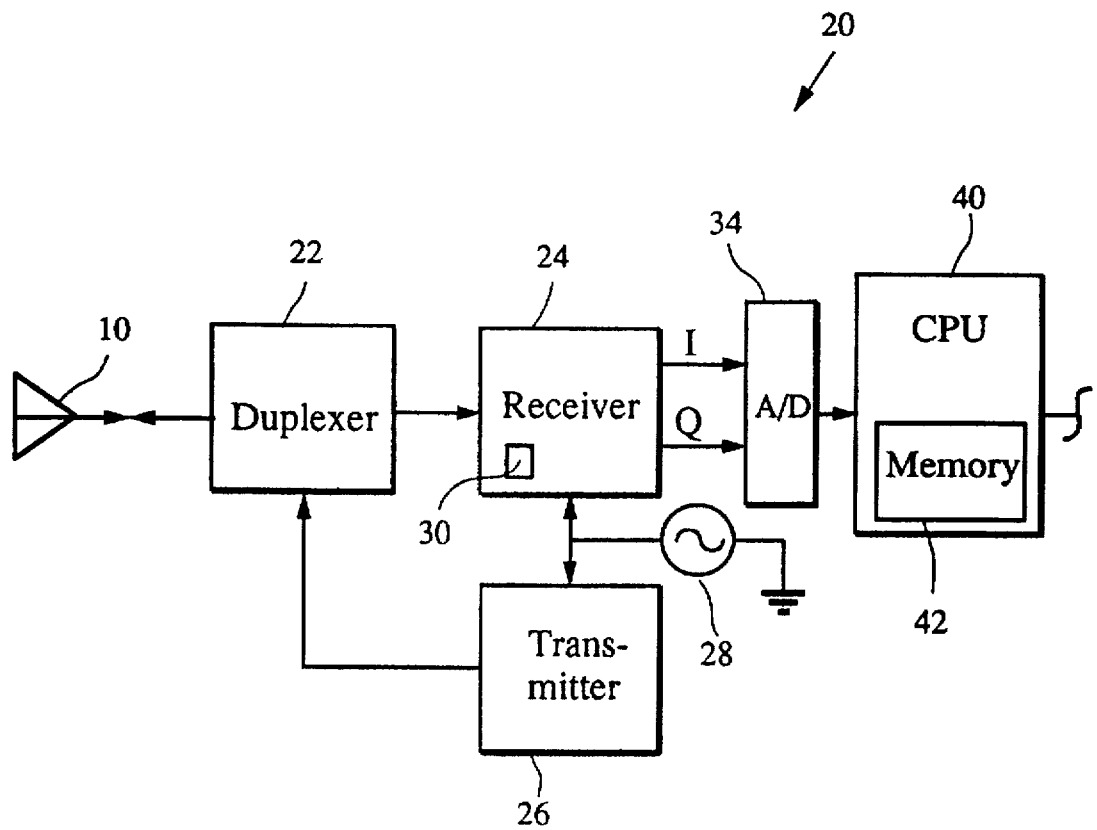
FIG. 2 is a schematic diagram of the pulsed doppler radar system in accordance with the teachings of the present invention.

With reference to FIG. 2, a pulsed doppler radar system 20 in accordance with the present invention is schematically illustrated. The system 20 includes the antenna 10 which is coupled to a duplexer 22 which, in turn, is coupled to a receiving block 24 and a transmitting block 26. A local oscillator 28 is coupled between the receiving block 24 and the transmitting block 26. The transmitting block 26 generates the electromagnetic pulses 12 which are transmitted via the antenna 10. The receiving block 24 includes a video filter 30 and outputs in phase (I) and quaduature (Q) signals. An analog to digital converter block 34 receives in phase (I) and quaduature (Q) signals from the receiving block 24. A central processing unit 40 receives digital return pulse signals from the analog to digital converter for processing in accordance with the method described in detail below. The central processing unit 40 includes memory circuitry illustrated by block 42 for storing a table of column vector data representing simulated M-dimensional points and corresponding pulse arrival times used to estimate the range R.

The operation of the system 20 will now be discussed in detail. It should be appreciated by one skilled in the art that the following equations/mathematical calculations are programmed into the system 20 using assembly language or other suitable programming languages.

Figure 3:
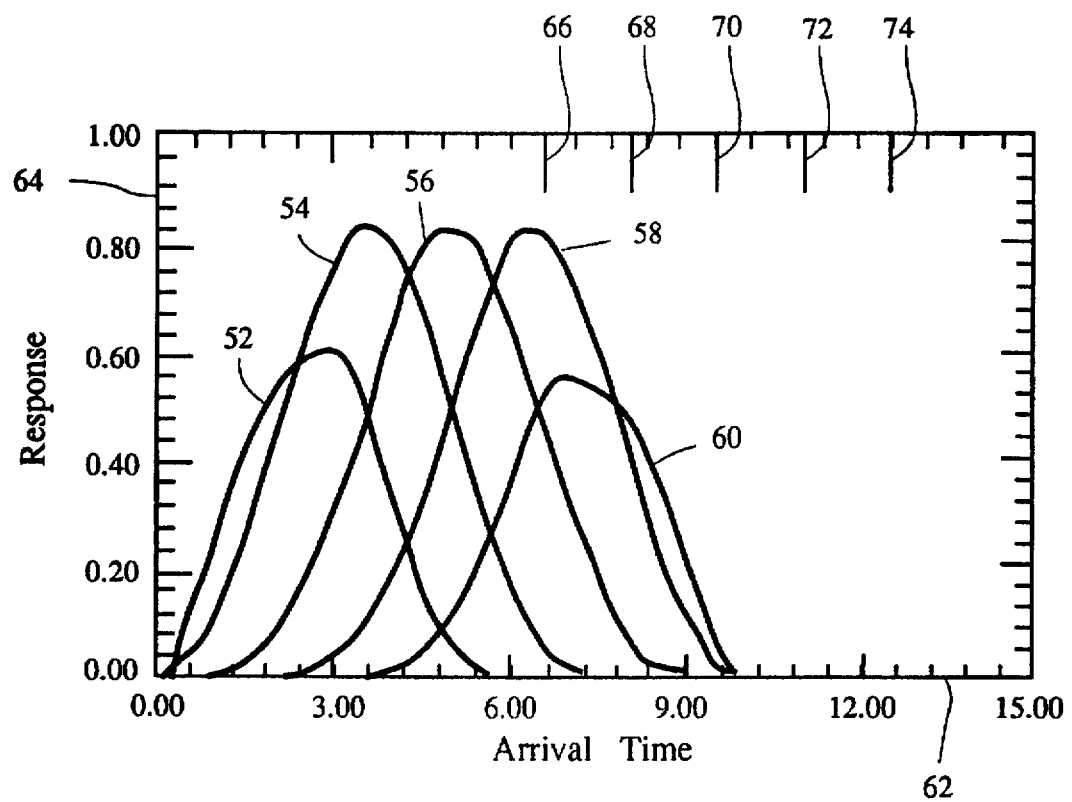
FIG. 3 illustrates five return pulse samples taken at different times in accordance with the teachings of the present invention.

FIG. 3 contains a graph 50 representing a single sampled return pulse as a function of arrival time. The voltage response curves 52, 54, 56, 58 and 60 represent the samples taken of the return pulse corresponding to different sample times. The horizontal axis 62 represents return pulse arrival times in μ seconds. The vertical axis 64 represents normalized return pulse sample voltages. For the example return pulse shown, M number of return pulse samples, where M equals five in this graph, are taken as a function of pulse arrival time. It will be appreciated that M may equal a much larger number in order to increase the accuracy of the system 20. The curves 52, 54, 56, 58 and 60 are uniformly sampled over an interval of 6.6 μs through 12.6 μs as indicated by vertical lines 66, 68, 70, 72 and 74. The difference in positions between the sample times indicated by lines 66 through 74 and the peak arrival times of the curves 52 through 60 is due to a delay of approximately 4.56μ seconds through the video filter 30 of the system 20. For example, the middle sample 70 is at approximately 9.6μ seconds and the curve 56 gives a peak for an arrival time of approximately 5μ seconds. For each of the arrival times of the given return pulse indicated by the horizontal axis 62, there are five corresponding values of range samples obtained from the curves 52 through 60. Because any one of the return pulses 16 may be represented as five response voltage values for each of the return pulse arrival times as shown in graph 50, a precomputed table of known response voltages may be generated as a function of known pulse arrival times. This table of response values is calculated by choosing N number of expected pulse arrival times, corresponding to a given ambiguity range of the system, and precomputing M number of simulated response voltages for each of the expected pulse arrival times. This table is stored in the memory 42 in column format for use as discussed below.

In accordance with standard antenna techniques, if the pulse arrival time (t) of one of the return pulses 16 is accurately determined, the range R to the target 14 may be determined by multiplying the pulse arrival time, t, by the speed of light, c, and the dividing by two.

Figure 4:
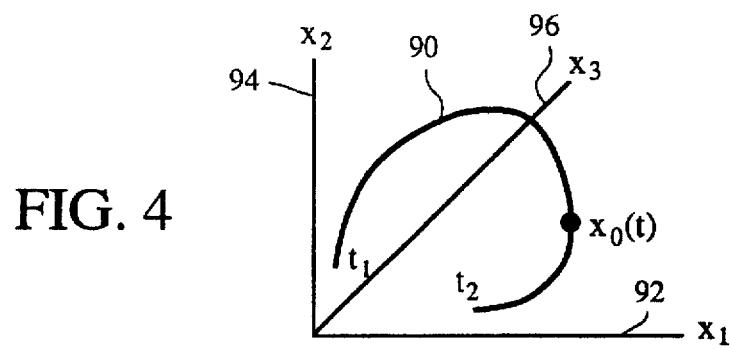
FIG. 4 is a graph illustrating N number of simulated M-dimensional sample points as a function of return pulse arrival times over a range of expected return pulse arrival times and illustrated as a curve in accordance with the teachings of the present invention.

With reference to FIG. 4, for each of the N number of the known or expected arrival times (t), the M number of simulated sample voltages may be represented as a M-dimensional point $x_o(t)$, where M equals five representing the five curves 52 through 60. All N number of the M-dimensional points are illustrated as a curve 90 extending over the range $t=t_1$ through $t=t_2$, representing the precalculated expected pulse arrival times. The curve 90 represents a noise free response curve in the M-dimensional hyperspace.

It is apparent that only three axes 92, 94 and 96 of the M number of axes are shown. Each of the illustrated axes 92, 94 and 96 of the M-dimensional space represent the voltages responses for the simulated return pulse samples as represented by curves 52 through 60. As will be discussed in detail below, each of the stored pulse arrival times and the M number of voltage samples corresponds to one of the simulated M-dimensional points $x_o(t)$ which is used to estimate the range R to the target.

In operation, for each of the known N pulse arrival times, M number of known pulse response voltages are generated to define a simulated M-dimensional vector representing one of the M-dimensional points $x_o(t)$ on the curve 90. Preferably, N equals fifty to obtain an acceptable accuracy, but a higher or lower number may be used for a particular application. Each of the known pulse response voltages defining the N number of simulated M-dimensional points on the curve 90 are stored within the memory 42 as a function of the pulse arrival times (t) over the range $t_1$ through $t_2$. Therefore, this table of voltage values represents a noise free simulated return pulse to which an actual measured return pulse 16 is compared to determine which of the simulated points and corresponding return pulse times most accurately represents the measured pulse and the range R.

Figure 5:
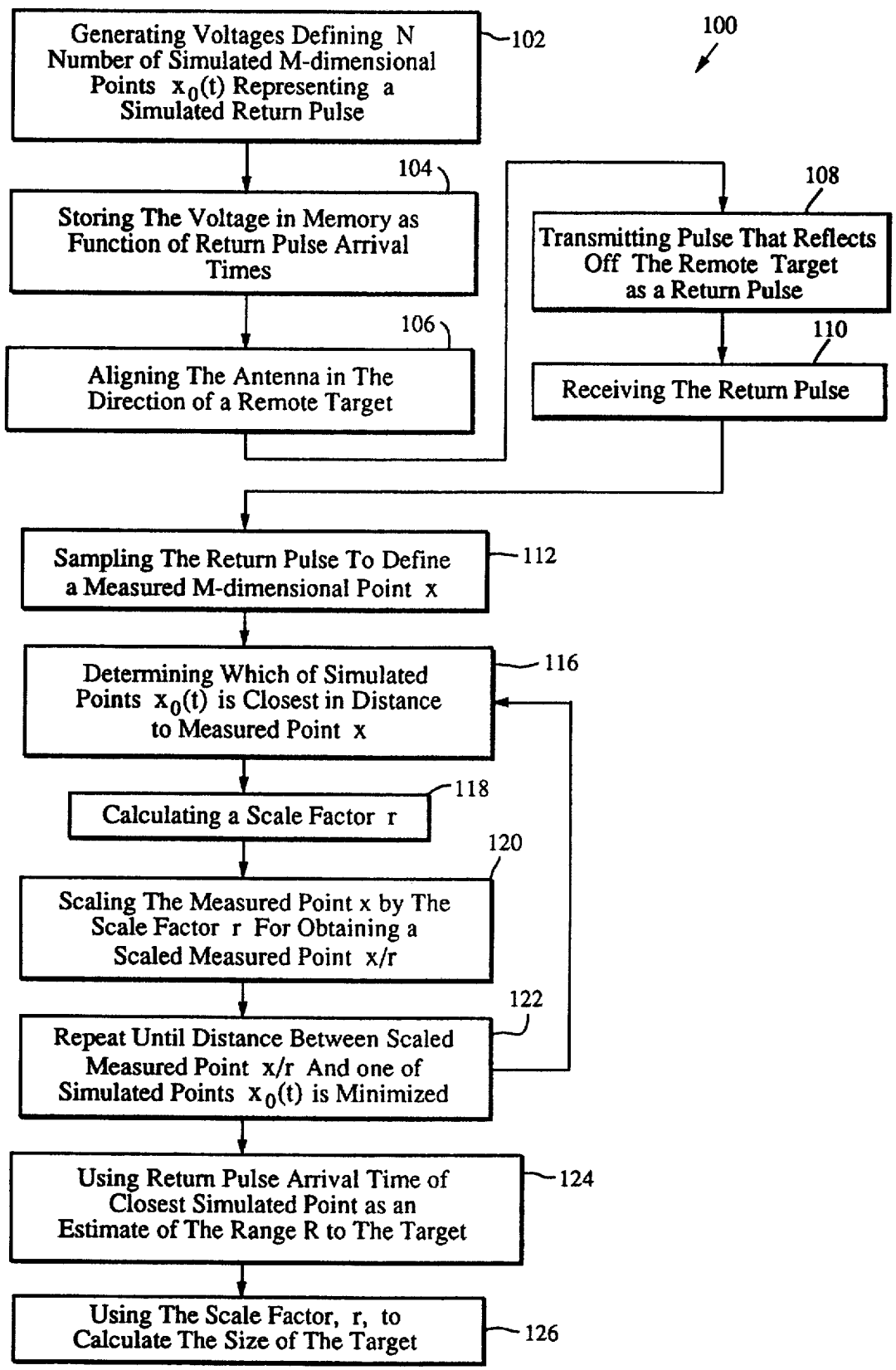
FIG. 5 is a block diagram illustrating the general steps carried out for using the pulsed doppler radar system to determine the range R to the remote target.

Turning to FIG. 5, a block diagram 100 outlining the general steps for the method of using the radar system 20 to determine an estimate of the range R is shown. The first step 102 involves generating simulated return pulse response voltages defining N number of simulated M-dimensional points $x_o(t)$ defining the curve 90 shown in FIG. 4. As discussed above, the curve 90 represents a simulated noise free return pulse with known arrival times and voltage responses. Next, step 104 involves storing the simulated return pulse data in the memory 42 as a function of return pulse arrival times (t) over the range $t=t_1$ through $t=t_2$, i.e. each return pulse time (t) has M number of corresponding voltage response values. Therefore, at this point, the memory 42 is provided with a table of pulse response values and corresponding pulse return times which are used as discussed below to determine an estimate of the range R from a measured return pulse 16.

Figure 6:
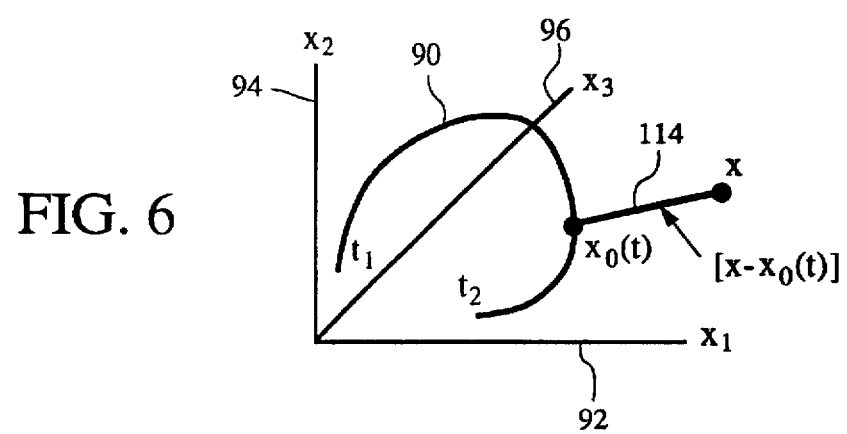
FIG. 6 is a graph geometrically illustrating a distance between a M-dimensional measured point, x, and one of the simulated M-dimensional points, $x_o(t)$, corresponding to a particular return pulse arrival time in accordance with the teachings of the present invention.

Once the simulated return pulses have been calculated and stored in the memory 42, the next step 106 is to align the antenna 10 in the direction of the remote target 14. Step 108 involves transmitting at least one of the pulses 12 which reflects off the target 14 as a return pulse 16. The next step 10 is to receive the return pulse 16 with the antenna 10. Step 112 involves sampling the single return pulse 16 for obtaining M number of response voltages, as illustrated in FIG. 3, defining an actual measured M-dimensional point x as shown in FIG. 6. Preferably, the analog to digital converter 34 has a sampling rate which is much faster than the rate at which the pulses 12 are transmitted. The return pulse 16 is sampled as discussed above in conjunction with the representative pulse shown in FIG. 3. Preferably, the return pulse 16 is sampled five times as represented by lines 66, 68, 70, 72, and 74. As such, these five response voltage values represent a measured vector and measured five-dimensional point x as shown in FIG. 6. Due to noise effects and attenuation of the return pulse 16, the point x is located a distance, represented by line 114, away from the noise free response curve 90. The next step 16 is using the central processing unit 40 to determine which of the precomputed and stored simulated points $x_o(t)$ is closest in distance to the measured point x. The specific technique of determining this distance will be discussed in detail below. Once the closest simulated point $x_o(t)$ is determined, this point's corresponding stored return pulse arrival time (t) is used to determine an estimate of the range R.

The next step 118 involves calculating a scale factor r from the closest simulated point $x_o(t)$ and the measured point x. Step 120 involves scaling the measured point x by the scale factor r for obtaining a scaled measured point x/r which is closer to the curve 90 which, in turn, provides a more accurate estimate of the range R. Next, step 122 involves replacing the measured point x in step 116 with the scaled measured point x/r to determine which of the stored simulated points $x_o(t)$ is closest in distance to the scaled measured point x/r and the return pulse arrival time (t) corresponding to the new closest simulated point. Steps 116 through 122 are repeated to continue to find a new closest simulated point $x_o(t)$ and corresponding return pulse arrival time. The scale factor r is also recalculated until the distance between a final scaled measured point x/r and one of the simulated points $x_o(t)$ is minimized. The next step 124 involves using the return pulse arrival time (t) corresponding to the closest simulated point from step 122, which is stored in the memory 42, to calculate an estimate of the range R to the target. As set forth above the range R is calculated by: R=ct/2. The final step 126 is to use the scale factor r to calculate the size or cross-section of the target 114 as will be discussed below.

Returning to step 116, in order to get an accurate estimate of the range R in step 124, the measured point x is compared with each of the N number of stored simulated M-dimensional points $x_o(t)$ represented by the curve 90 to determine which is closest in distance to the measured point x. As illustrated in FIG. 6, this distance is graphically represented by the line 114. Basically, the central processing unit 40 searches the table of data in memory 42 and compares each of the simulated points $x_o(t)$ with the measured point x.

In order to perform the comparison, it is convenient to define a dot product between a complex M-dimensional column vectors. If A represents the measured point x and a complex M-dimensional column vector B represents one of the simulated points $x_o(t)$ stored in the memory 42 then:

$$A \cdot B \equiv A \dagger C^{-1} B \qquad \text{Eq.1}$$

The term C is the covariance matrix given in terms of a noise vector n out of the video filter 30 as:

$$C = (nn\dagger) \qquad \text{Eq.2}$$

In a five-dimensional example, the covariance matrix C is as follows:

$$C = \sigma_{max}^2 \begin{bmatrix} .672 & .549 & .131 & .007 & -.003 \\ .549 & .988 & .607 & .132 & .005 \\ .131 & .607 & 1.000 & .608 & .132 \\ .007 & .132 & .608 & .992 & .564 \\ -.003 & .005 & .132 & .564 & .574 \end{bmatrix} \qquad \text{Eq. 3}$$

The matrix elements are normalized to the maximum entry and the numbers will all change with different sampling times or a different video filter. Similarly, the corresponding inverse is as follows:

The dot product defined in Equation 1 is no longer commutative. Reversing the order of A and B produces the $$C^{-1} = \frac{1}{\sigma_{max}^2} \begin{bmatrix} 3.88 & -3.52 & 2.64 & -1.95 & 1.37 \\ -3.52 & 5.36 & -4.66 & 3.61 & -2.55 \\ 2.64 & -4.66 & 6.39 & -5.69 & 4.18 \\ -1.95 & 3.61 & -5.69 & 7.49 & -6.10 \\ 1.37 & -2.55 & 4.18 & -6.10 & 6.81 \end{bmatrix} \qquad \text{Eq. 4}$$

complex conjugate of the result.

As such, the distance squared $D^2$ between the two vectors A and B follows in a natural way from this definition of the dot product and may be defined as:

$$D^2 \equiv \|A - B\|^2 \equiv (A-B) \cdot (A-B) \qquad \text{Eq.5}$$

Again, the vector A represents the measured point x and the vector B represents each of the simulated points $x_o(t)$. As such, Equation 5 defines the distance squared and therefore distance between the measured point x and the simulated point $x_o(t)$.

The probability density function f(x,t) for the measured point x may be represented as follows:

$$f(x,t) = \frac{\exp\left[-\frac{1}{2}(x - x_0(t))\dagger C^{-1}(x - x_0(t))\right]}{(2\pi)^{\frac{M}{2}}\sqrt{|C|}} \qquad \text{Eq. 6}$$

In this Equation, x is the measured point x and $x_o(t)$ is one of the simulated points which are both in terms of M-dimensional complex column vectors. Again, C is the covariance matrix given in terms of the noise vector n out of the video filter 30. The increment of probability is produced by multiplying f by the M-dimensional element of volume $d^M x$. In Equation 6, the pulse arrival time t is treated as fixed parameter determining the mean of the distribution of random variables represented by the simulated points $x_o(t)$. Equation 6 is simplified in terms of the distance squared represented by line 114 as defined in Equation 5:

$$f(x,t) = \frac{\exp\left[-\frac{1}{2}\|x-x_0(t)\|^2\right]}{(2\pi)^{\frac{M}{2}}\sqrt{|C|}} \qquad \text{Eq. 7}$$

For a particular measured point x, the objective is to estimate the pulse arrival time t corresponding to the mean of the distribution. The maximum likelihood argument is simple in this case. Basically, a value t corresponding to a stored pulse arrival time in the memory 42 is chosen for maximizing the probability density function of Equation 7 using the the measured point x vector as a constant. The determined value of t is then the most likely pulse arrival time for the measured point x and the return pulse 16. This is equivalent to minimizing the exponent in Equation 7 and, hence, minimizing the generalized distance between the measured point x and the simulated points $x_o(t)$. These simulated points $x_o(t)$, of course, form the line 90 as shown in FIG. 4. Therefore, once the measured point x has been sampled, the table of pulse arrival times stored in memory 42 is searched to determine the closest simulated point $x_o(t)$, and its corresponding pulse arrival time which is used a time estimate for the actual return pulse arrival time for the return pulse 16.

As discussed above, this return pulse arrival time is used to determine the range R within a high accuracy.

In accordance with step 118, assuming $x = r\, x_o(t)$ for a estimated pulse arrival time t, a signal scale factor r is determined as follows:

$$\frac{x_0(t)\cdot x}{x_0(t)\cdot x_0(t)} = \frac{x_0(t)\cdot rx_0(t)}{x_0(t)\cdot x_0(t)} = r\frac{x_0(t)\cdot x_0(t)}{x_0(t)\cdot x_0(t)} = r \qquad \text{Eq. 8}$$

This scale factor r is used to scale the initial measured point x to obtain a scaled measured point x/r. The process outlined in steps 116 through 122 is repeated to find which of the simulated points $x_o(t)$ is closest in distance to the scaled measured point x/r and that simulated point's corresponding pulse arrival time is the new estimated pulse arrival time. Again, the newly determined pulse arrival time is used to calculate a new more accurate estimate of the range R. Steps 116 through 122 are repeated until the distance 114 is minimized as determined by the central processing unit 40 when the change in distance between the measured point x and the simulated points $x_o(t)$ converges.

Figure 7:
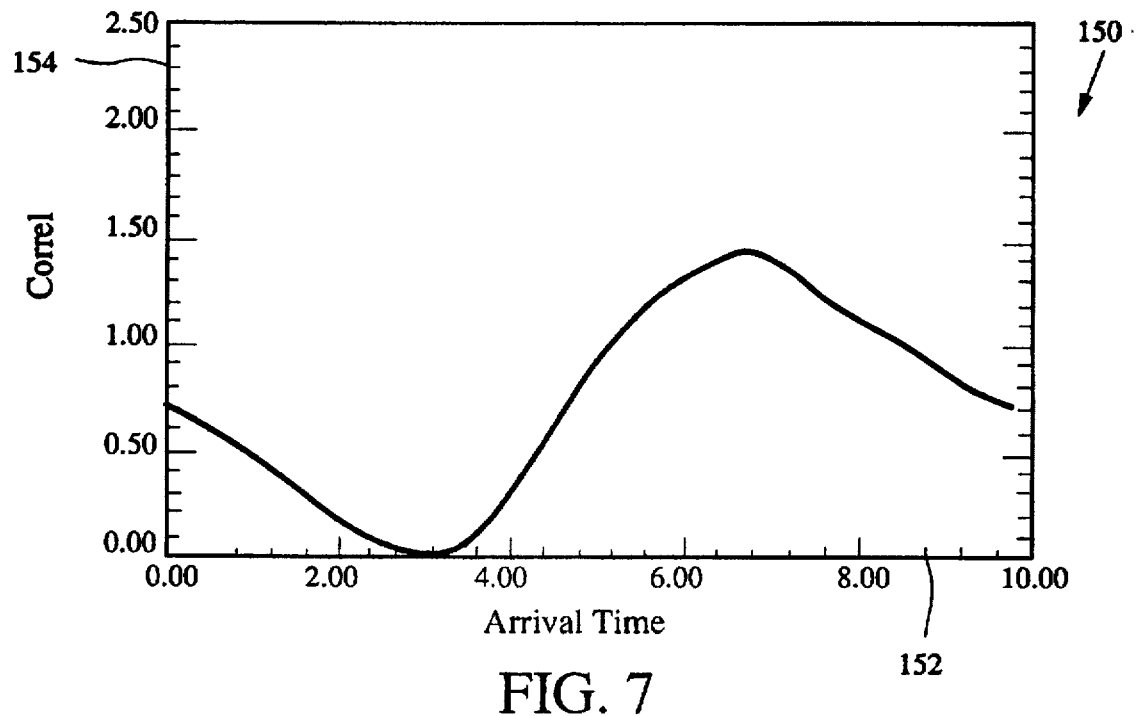
FIG. 7 is a graph of the square of a generalized distance of a unity scaled return pulse in accordance with the teaching of the present invention.

This minimization is illustrated in FIG. 7 in which graph 150 shows an example of the square of the generalized distance ($D^2$) for a noiseless actual measurement of a unity scaled return pulse, i.e. r=1, arriving at an arrival time of t=3μ seconds. The horizontal axis 152 ranges over all of the expected return pulse times stored in the memory 42 for each of the stored voltage values for the simulated points $x_o(t)$. Clearly, at t=3μ seconds, the squared distance as measured by the vertical axis 154 goes to zero.

Figure 8:
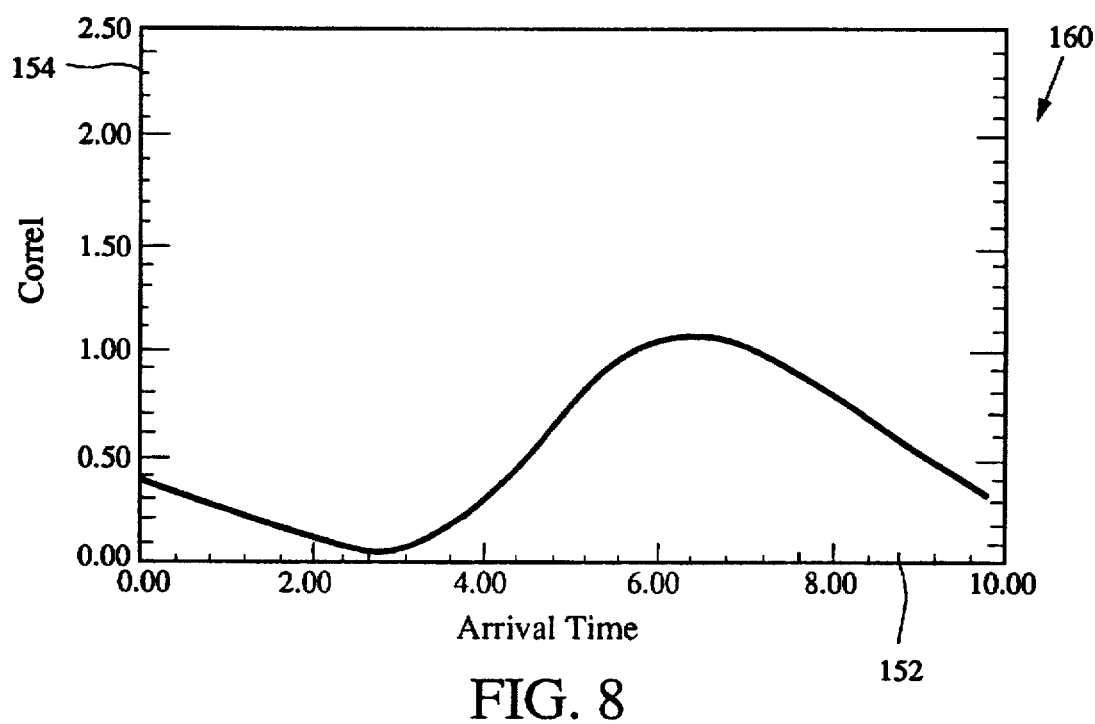
FIG. 8 is a graph of the square of the generalized distance of the return pulse scaled by a different valued scale factor in accordance with the teaching of the present invention.

In FIG. 8, a graph 160 for the return pulse scaled with a scale factor r set arbitratorily to 0.7 is shown. The squared distance ($D^2$) is no longer zero at t=3μ seconds, but the minimum of the function is approximately at that arrival time. Therefore, the central processing unit 40 can search the stored return pulse arrival times, calculate the squared distance, an calculate the local minimum.

Because the scale factor r is complex, it provides both target magnitude and phase from which the cross-section of the target 14 may be calculated by the following:

$$\sigma = k|r|^2 R^4 \qquad \text{Eq. 9}$$

where r is the scale factor, R is the range to the target 14, and k is a conversion factor relating the stored point normalization to the gain factors of the radar system 20.

The foregoing discloses and describes merely exemplary embodiments of the present invention. One skilled in the art will readily recognize from such discussion and from the accompanying drawings and claims, that various changes, modifications and variations can be made therein without departing from the spirit and scope of the present invention as defined by the following claims.

What is claimed is:

1. A method of determining a range from a radar system to a remote target, comprising the steps of:
    (a) generating voltages defining simulated vectors representing a simulated return pulse as a function of a range of expected return pulse arrival times;
    (b) aligning an antenna of the radar system substantially in the direction of the remote target;
    (c) transmitting at least one electromagnetic pulse in the direction of the remote target such that the pulse reflects off the remote target as a return pulse;
    (d) receiving the return pulse with the antenna;
    (e) sampling the return pulse at a plurality of times defining a measured vector;
    (f) determining which of the simulated vectors is closest in distance to the measured vector; and
    (g) using the return pulse arrival time corresponding to the closest simulated vector to determine the range to the remote target.

2. The method of claim 1, further comprising the steps of:
    (h) calculating a scale factor based upon the measured vector and the closest simulated vector;
    (i) scaling the measured vector by the scale factor for obtaining a scaled measured vector;
    (j) comparing the scaled measured vector with each of the simulated vectors for determining which one of the simulated vectors is the closest to the scaled measured vector; and
    (k) using the return pulse arrival time corresponding to the closest simulated vector to determine a new more accurate range to the remote target.

3. The method of claim 2, further comprising the steps of:
    (l) replacing the measured vector in step (e) with the scaled measured vector;
    (m) repeating steps (f) through (k) until the distance between the scaled measured vector and one of the simulated vectors is minimized; and
    (n) calculating a range to the target based upon the return pulse arrival time corresponding to a final simulated vector from step (m).

4. The method of claim 1, wherein the step (a) includes the steps of:
    computing a plurality of simulated M-dimensional points as a function of return pulse arrival times over the range of expected return pulse arrival times; and
    storing the computed simulated points as a function of return pulse arrival times in a memory of the radar system.

5. The method of claim 4, wherein the step (e) includes the step of:
    sampling the return pulse at M different times in order to obtain M number of samples representing a measured M-dimensional point.

6. The method of claim 4, wherein the step (f) includes the step of:
    comparing the measured point with each of the simulated points stored in the memory for determining which one of the simulated points is the closest the measured point.

7. The method of claim 4, wherein M equals at least five.

8. A method of determining an estimate of a range from a radar system to a remote target, comprising the steps of:
    (a) computing a plurality of simulated M-dimensional points as a function of return pulse arrival times over a range of expected return pulse arrival times;
    (b) storing the computed simulated points as a function of return pulse arrival times in a memory of the radar system;
    (c) aligning an antenna of the radar system substantially in the direction of the remote target;
    (d) transmitting at least one electromagnetic pulse in the direction of the remote target such that the pulse reflects off the remote target as a return pulse;
    (e) receiving the return pulse with the antenna;
    (f) sampling the return pulse at M different times in order to obtain M number of samples representing a M-dimensional measured point;
    (g) comparing the measured point with each of the simulated points stored in memory for determining which one of the simulated points is the closest the measured point; and
    (h) using the return pulse arrival time corresponding to the closest simulated point to determine an estimate of the range to the target.

9. The method of claim 8, further comprising the steps of:
    (i) calculating a scale factor based upon the measured point and the simulated point determined in step (g);
    (j) scaling the measured point by the scale factor for obtaining a scaled measured point;
    (k) comparing the scaled measured point with each of the simulated points stored in memory for determining which one of the simulated points is the closest the scaled measured point; and
    (l) using the return pulse arrival time corresponding to the closest simulated point to determine a new more accurate estimate of the range to the target.

10. The method of claim 9, further comprising the steps of:
    (m) replacing the measured point in step (f) with the scaled measured point;
    (n) repeating steps (f) through (k) until the scaled measured point approximately equals one of the simulated points stored in memory; and
    (o) calculating an estimate of range to the target based upon the return pulse arrival time corresponding to a final simulated point from step (n).

11. The method of claim 8, wherein M equals at least five.

12. The method of claim 8, wherein the step (a) includes the steps of:
    determining N number of expected pulse arrival times over the range of expected arrival times; and
    generating M number of simulated return pulse samples for each of the N expected pulse arrival times for defining N number of the simulated M-dimensional points.

13. The method of claim 12, wherein N equals at least fifty.

14. The method of claim 8, wherein the step (g) includes the steps of:
    computing the distance squared between the measured point and each of the simulated points stored in the memory; and
    determining the stored pulse arrival time corresponding to the simulated point with the smallest distance squared to the measured point.

15. The method of claim 14, wherein the step of computing the distance squared includes the step of:
    determining the maximum probability density function representing the minimized distance between the measured point and each of the simulated points.

16. The method of claim 9, wherein the step (i) includes the step of:
    calculating a dot product between the measured point and a unit vector in the direction of the simulated point determined in step (g).

17. The method of claim 8, wherein the step of aligning the antenna includes:
    aligning a pulsed doppler radar antenna in the direction of the remote target for transmitting the at least one pulse.

18. The method of claim 9, further comprising the step of:
    (m) calculating an estimate of the size of the remote target based upon the scale factor.

19. A radar system for determining a range to a remote target, comprising:
    (a) means for generating voltages defining simulated vectors representing a simulated return pulse as a function expected return pulse arrival times;
    (b) an antenna for transmitting at least one electromagnetic pulse in the direction of the remote target and for receiving a return pulse that has reflected off the remote target; and
    (c) means for sampling the return pulse at a plurality of times defining a measured vector for determining which of the simulated vectors is closest in distance to the measured vector, whereby the return pulse arrival time corresponding to the closest simulated vector represents the range to the remote target.

20. The radar system of claim 19, wherein (a) includes:
    processor means for computing a plurality of simulated M-dimensional points as a function of return pulse arrival times over a range of expected return pulse arrival times; and
    memory means for storing the computed simulated points as a function of return pulse arrival times.

* * * * *